United States Patent [19]

Caparosa

[11] Patent Number: 5,236,364
[45] Date of Patent: Aug. 17, 1993

[54] STEREOSCOPIC FILMSTRIP TEACHING MACHINE

[76] Inventor: Ralph J. Caparosa, 485 Marrietta Pl., Pittsburgh, Pa. 15228

[21] Appl. No.: 740,163

[22] Filed: Aug. 5, 1991

[51] Int. Cl.$^5$ .............................................. G02B 27/00
[52] U.S. Cl. .......................................... 434/308; 353/7
[58] Field of Search ................................. 359/462–474; 351/201; 434/308–310, 314; 353/7; 352/57–64

[56] References Cited

U.S. PATENT DOCUMENTS

| | | | |
|---|---|---|---|
| 2,422,384 | 6/1947 | Alexander | 351/201 |
| 4,158,480 | 6/1979 | Mitchell | 359/466 |
| 4,912,388 | 3/1990 | Tanaka et al. | 359/382 |
| 4,982,278 | 1/1991 | Dahl et al. | 359/466 |

Primary Examiner—Richard J. Apley
Assistant Examiner—Glenn E. Richman
Attorney, Agent, or Firm—Sughrue, Mion, Zinn, Macpeak & Seas

[57] ABSTRACT

A teaching apparatus for continuous stereoscopic filmstrip viewing while simultaneously hearing a related audio tape, comprising
(a) an adjustable stereoscopic viewing head which houses a continuous stereoscopic filmstrip;
(b) a base unit comprising an audio cassette tape player; and
(c) means connecting the viewing head to the base unit which allow the position of the viewing head to be adjusted relative to a person viewing the filmstrip.

4 Claims, 3 Drawing Sheets

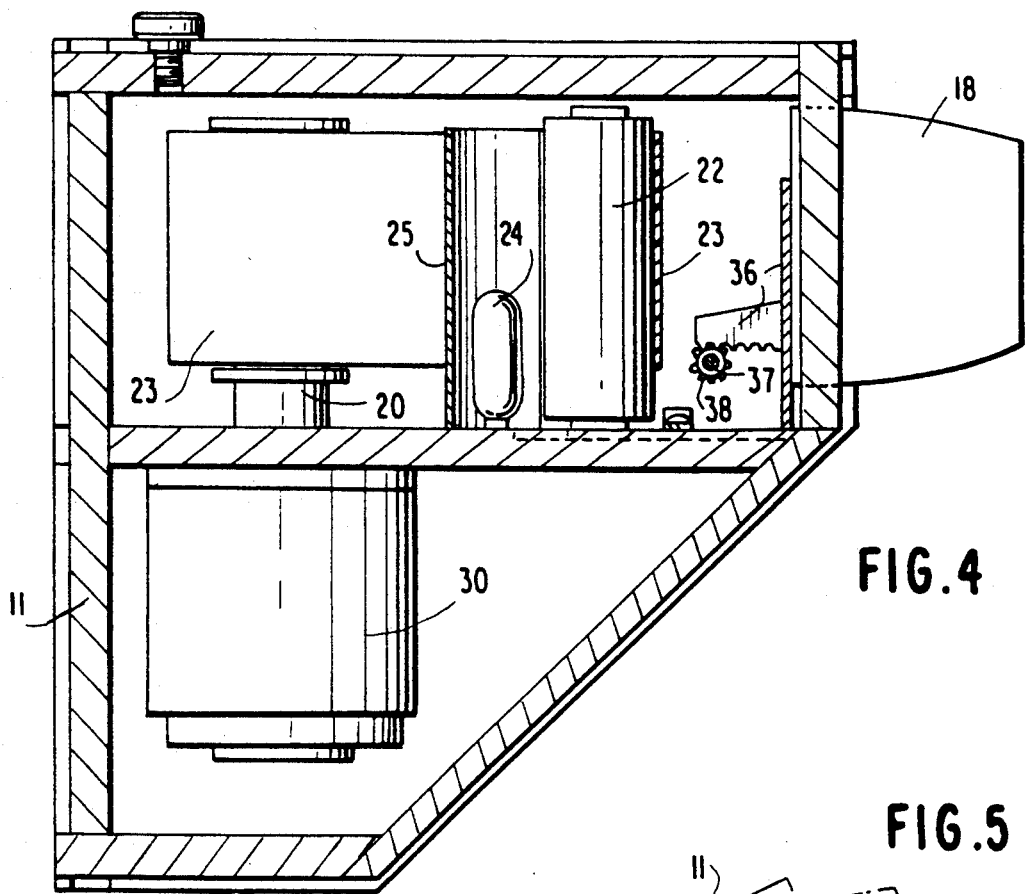
FIG.4
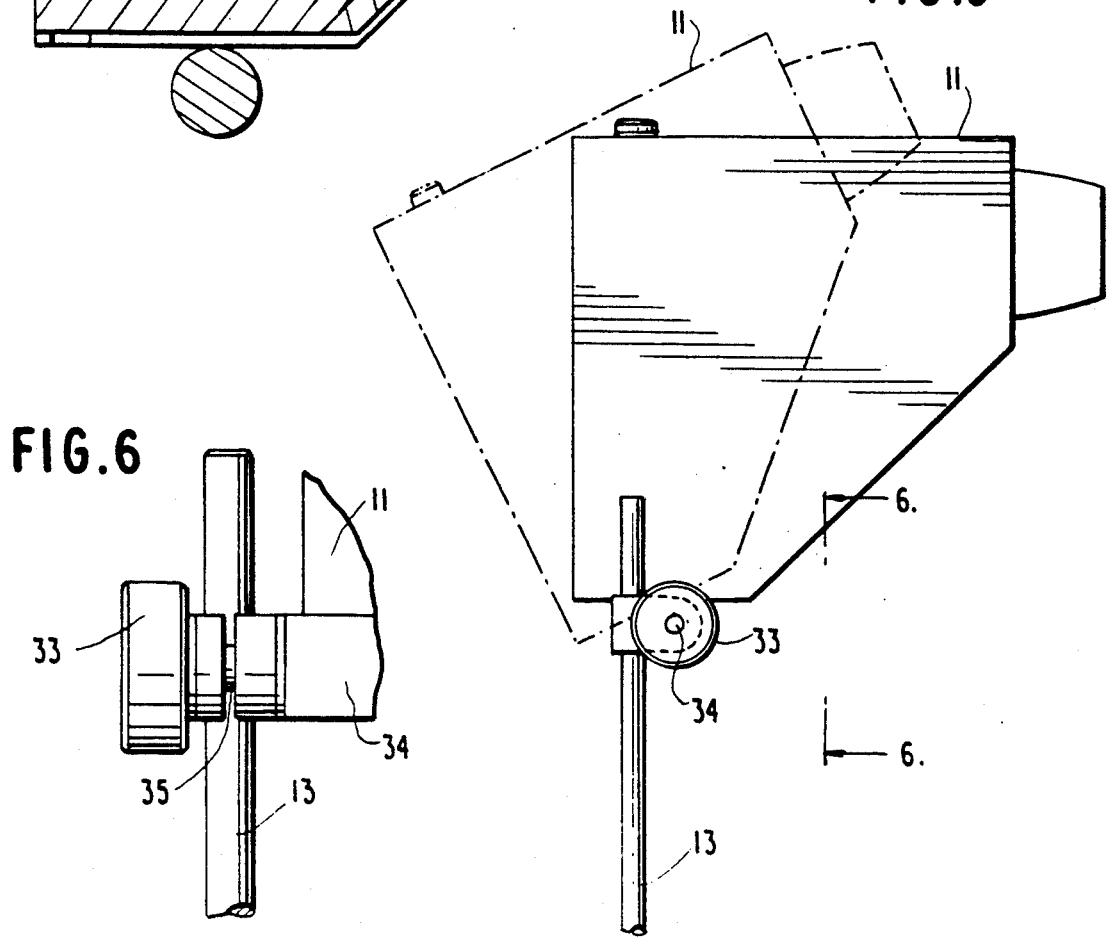
FIG.5
FIG.6

STEREOSCOPIC FILMSTRIP TEACHING MACHINE

FIELD OF THE INVENTION

The present invention relates to an apparatus used for teaching. In particular, the present invention relates to an apparatus adapted for continuous stereoscopic filmstrip viewing while simultaneously hearing a related audio tape.

BACKGROUND OF THE INVENTION

Stereoscopic viewers have been known for quite some time. However, today's commercially available stereoscopic viewers are adapted only for use with individual slides or photographs, not for continuous stereoscopic filmstrips, such as 35 mm rolls. Nonetheless, the concept of continuous stereoscopic filmstrip viewers is described in a number of U.S. Patents. See, for example, U.S. Pat. Nos. 2,573,543, 2,590,260, 2,814,966, 3,414,346, 3,473,870, 4,026,636, 4,142,778 and 4,256,367.

However, none of these patents describe a machine or apparatus which allows for hand-free continuous stereoscopic filmstrip viewing, simultaneously hearing a related audio tape, in a manner which allows the apparatus to be used as a versatile teaching machine.

SUMMARY OF THE INVENTION

Accordingly, one object of the present invention is to provide a teaching machine for continuous stereoscopic filmstrip viewing while listening to a related audio tape.

Another object of the present invention is to provide a versatile apparatus for teaching, which allows the position of the viewing head to be conveniently adjusted to adapt to viewer preference and size, while, for example, seated at a desk or standing.

A significant advantage is that development of the master film stereoscopic strip only needs one source. This is most significant in the teaching of both human and animal anatomy and surgery. Thus only one cadaver is needed to show life-like complicated structures of the anatomy and also of the most intricate surgical procedures. Only one animal is needed to develop the anatomy and veterinary surgery in three dimension. This will serve to reduce by a very large number, the animals that are presently being killed for teaching purposes. Actual classroom or laboratory animal dissection could be eliminated.

Still another object of the present invention is to provide a teaching machine which allows for convenient and efficient viewing of the filmstrip by advancing it within the viewing head in a forward or reverse direction by means of a foot pedal. Also, another aspect of the present invention provides for concomitant playback and rewinding of a corresponding audio tape within the base unit, which describes the contents of the filmstrip, by means of a foot pedal.

The above and other objects and advantages of the present invention are attained by a teaching apparatus for continuous stereoscopic filmstrip viewing while simultaneously listening to a descriptively related audio tape comprising, in its broadest aspects:

(a) an adjustable stereoscopic viewing head which houses a continuous stereoscopic filmstrip;

(b) a base unit comprising an audio cassette tape player; and (c) means connecting the viewing head to the base unit which allow the position of the viewing head to be adjusted relative to the person viewing the filmstrip.

In preferred embodiments of the invention, the base unit additionally comprises a foot pedal for advancing the filmstrip in forward and reverse directions, and a foot pedal for advancing the audio tape in forward (playback) and reverse (rewind) directions.

BRIEF DESCRIPTION OF THE DRAWINGS

FIG. 4 shows a side, cut-away view of the viewing head showing spool drive means.

FIGS. 5 and 6 show details for adjusting the viewing head housing.

DETAILED DESCRIPTION OF THE INVENTION

Figure 1:
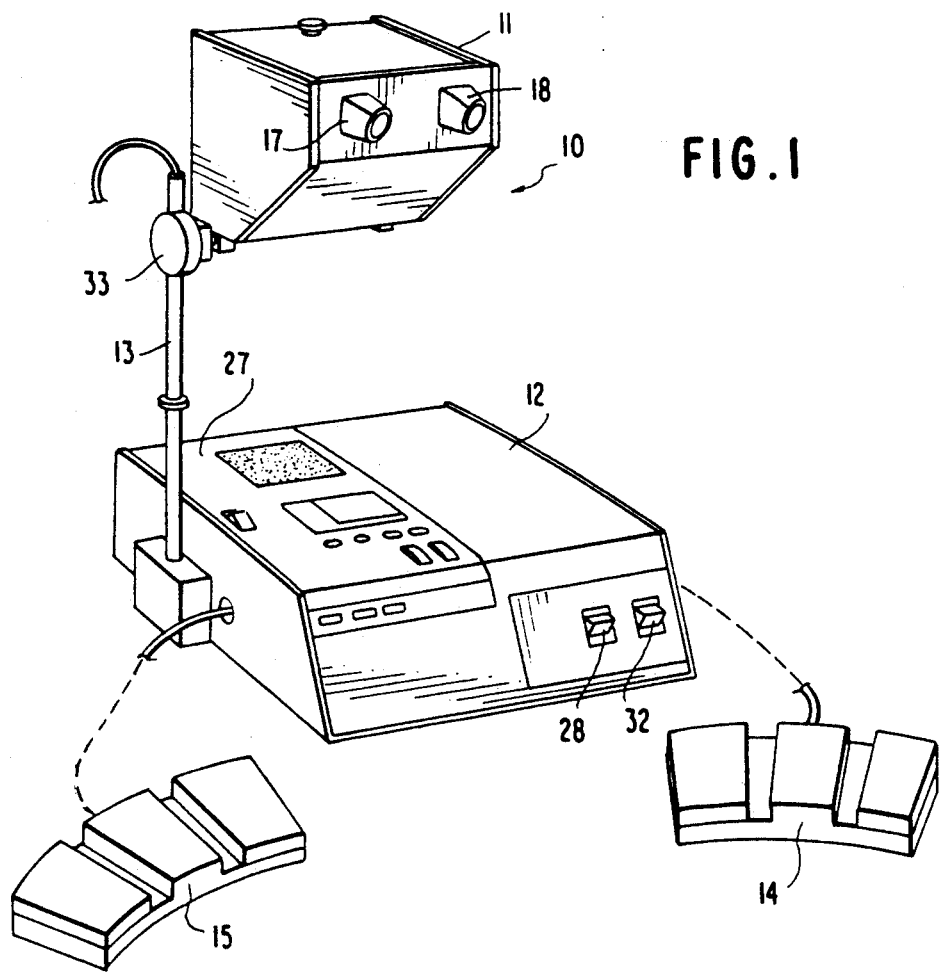
FIG. 1 shows an overall view of the teaching apparatus.

In practice, in many applications, standard 35 mm film is not sufficient to give proper depth and attention to details, particularly when film images are being used as a teaching tool. Accordingly, the three dimension depth perception in the stereoscopic strip serves as an improved teaching method in medical, veterinary, engineering, biology of both high school and college students and like fields. In particular, "histological anatomical" stereoscopic slides are often used in medical schools, for example human anatomy classes, to illustrate the details of various body tissues and surgical techniques.

However, when individual slides are used in conventional viewers (i.e., non-continuous film), class is conducted inefficiently because of the need for the students to change individual slides, as the teacher or instructor explains individual images. In the event of need for review, much time is consumed. As mentioned above, the concept of continuous stereoscopic film viewers has been suggested in the prior art, although not in the overall context of the present invention as a teaching machine. In practice, however, there is no continuous stereoscopic filmstrip viewer commercially available. Even if continuous stereoscopic viewers were available, from a teaching standpoint, the pairs of stereoscopic images being viewed by the student during class still require explanation. For example, the stereoscopic images may be explained by means of a written description, such as a textbook, which corresponds to the successive pairs of images on the filmstrip, or by an instructor's verbal explanation, or by a prerecorded audio source, such as a cassette tape. However, if a student wished to undertake independent study outside of actual classroom time, the student (assuming a hand-held continuous stereoscopic viewer was available) would have to hold the viewer to study the stereo images, and assuming a cassette tape was being used to describe the corresponding stereo images, the student would have to look down from the viewer, start and stop the cassette player manually, then look back into the viewer, etc. Certainly, such a cumbersome, time-consuming method of studying would not enhance the teaching of students.

The present invention is intended to replace the use of single slides. It provides a new method of teaching and independent study using continuous stereoscopic filmstrips in an efficient manner. According to the broadest aspects of the present invention, noted above, the present invention comprises an adjustable stereoscopic viewing head which houses the filmstrip, a base unit comprising an audio cassette tape player, and means connecting the viewing head to the base unit, which allow adjustment of the viewing head to fit individual viewer's preference while standing or seated, and which can be adapted to fit viewers of different sizes. The present invention is advantageous to the student's desk use.

According to a preferred embodiment of the present invention, the teaching apparatus for continuous stereoscopic filmstrip viewing while simultaneously listening to a descriptively related audio tape comprises:

(a) an adjustable stereoscopic viewing head which houses the filmstrip, the filmstrip having pairs of identical images spaced apart a fixed distance for showing successive pairs thereof, comprising:

a pair of viewing lenses having their optical axes at substantially interpupillary spacing, a pair of oppositely arranged spools and corresponding guide means in alignment with each of the spools to guide a filmstrip in a path transverse to the optical axes of the lenses as the filmstrip passes from one of the oppositely placed spools to the other, a viewing station through which the filmstrip passes the optical axes of the lenses in a correct manner at a distance permitting focused viewing of the stereoscopic images, including illumination means positioned between the filmstrip in the viewing station and a background screen for reflecting light, the lenses being adjustable proximally and distally relative to the filmstrip passing transversely to the optical axes for focusing a stereoscopic image, and drive means associated with each of the spools, one functioning to advance the filmstrip in a forward direction through the viewing station, the other functioning to advance the filmstrip in a reverse direction through the viewing station;

(b) a base unit comprising:

an audio cassette tape player, a foot control switch for operating an audio tape inserted in the cassette tape player in a forward (playback) direction and a reverse (rewind) direction, and a foot control switch for operating the drive means to advance the filmstrip in each of a forward direction and a reverse direction; and (c) means connecting the viewing head to the base unit and providing a conduit for wires connecting the drive means and the illumination means to a power source through the base unit, and allowing the viewing head to be adjusted vertically relative to the base unit, in an arc about the vertical axis of the connecting means, and to be tilted relative to a transverse horizontal axis.

With reference to the drawings, a preferred embodiment of the present invention is described in further detail below.

FIG. 1 is an overall view of the teaching apparatus 10. The viewing head 11 is connected to the base unit housing 12 by connecting means 13. The foot control switch 14 advances the filmstrip in forward and reverse directions, by activating the drive means (e.g. motors) associated with each of the film spools in the viewing head. The foot control switch 15 advances the audio tape in forward (playback) and reverse (rewind) directions. Also, earphones (not shown), which plug into the cassette player in a known manner, may optionally be used to listen to the descriptive audio tape while viewing the stereoscopic filmstrip. The base unit 12 also houses appropriate wiring and power supply sources for operating the drive means and illumination means in the viewing head, the cassette tape player, and the foot pedals 14 and 15 described above. As would be understood by one of ordinary skill in the art, the base unit 12 preferably contains an on/off switch 28 for the illumination means in the viewing head, as well as an on/off general power switch 32 and an AC cord for plugging the machine into a standard grounded wall outlet.

The foot control switches 14 and 15 are suitably wired to operate the drive means and tape player, respectively. As depicted in FIG. 1, each foot control switch preferably comprises a forward (right-hand side) and a reverse (left-hand side) pedal which the viewer can conveniently operate from a standing or seated position according to preference.

The base unit 12 contains the audio cassette tape player 27. The type of audio cassette player is not critical. In a prototype built by the inventor, Sony Microcassette Transcriber M-2000 was used, with Sony FS-25 foot switches.

In a preferred embodiment, connecting means 13 comprises a cylindrical rod-shaped tube of metal, aluminum, plastic or the like, which houses wires connecting the drive means and illumination means in the viewing head to appropriate power supply sources through the base unit. The lower end of the connecting means 13 is suitably attached to base unit 12 housing, as shown in one example in FIG. 1. At the upper (viewing head) end, the connecting means is designed so as to allow for various types of adjustment of the viewing head, as shown in FIGS. 5 and 6. As depicted in these drawings, by tightening or loosening viewing head adjustment knob 33, the viewing head 11 may be titled relative to a transverse horizontal axis 34 (see FIG. 6, front view, horizontal axis), as shown in FIG. 5. FIG. 5, solid line, shows the viewing head 11 in a beginning position; the dotted line viewing head 11 shows a tilted position. Similarly, the connecting means may comprise a collar 35 which surrounds the cylindrical tube 13. The collar 35 may be tightened or loosened about the cylinder 13 by appropriate adjustment of the knob 33, allowing the viewing head 11 to be slid up and down the rod-shaped cylinder 13 in a vertical direction, or pivoted in an arc about the vertical axis of the connecting means 13. In this manner, the connecting means provides for versatile adjustment of the viewing head 11 so that it can be conveniently adapted to various heights, tilted in a forward or backward direction for viewing while seated or standing, and swung about an arc for viewing from different angles.

Figure 2:
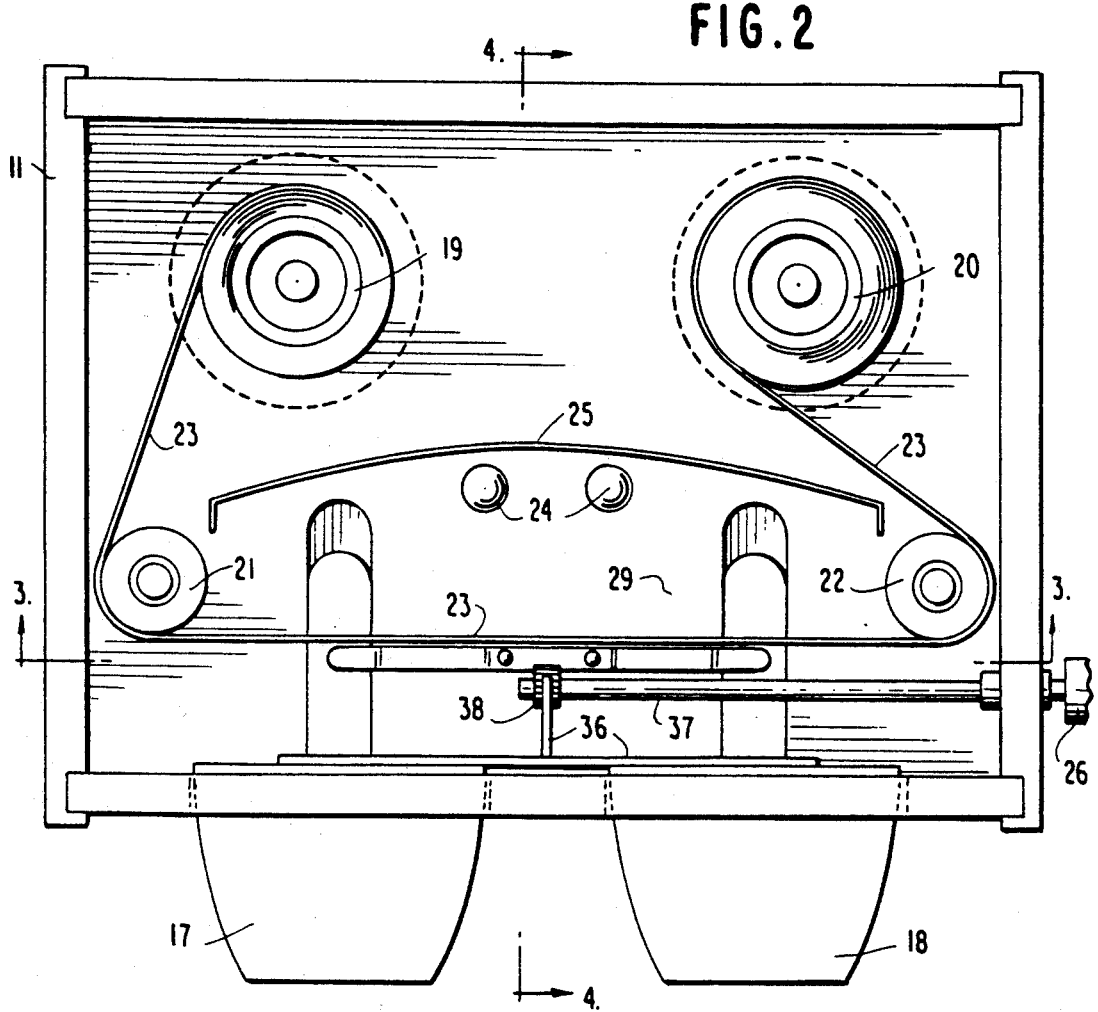
FIG. 2 shows a top view of the adjustable viewing head housing with the top plate removed.

FIG. 2 is a top view of the adjustable viewing head 11 with the top plate removed. As shown in the drawing, the viewing head may comprise an external housing of metal, aluminum, plastic, wood or the like, and may be molded as one piece, or may comprise individual plates suitably attached. Viewing lenses 17 and 18 are shown having their optical axes at optimum interpupillary spacing. The lenses are adjustable proximally and distally relative to the filmstrip which is positioned transversely to the optical axes in the viewing station, discussed below. Such proximal and distal adjustment may suitably be performed by adjusting knob 26. Proximal or distal adjustment of the lenses allows for focusing of the stereoscopic image. Adjusting knob 26 moves the lenses by means of a rack and pinion system as shown in FIG. 2. The knob is connected to rod 37, which itself is attached to a small gear 38. Gear 38 interacts with a plate 36 (see also FIG. 4, side view) which is attached to the lenses. Accordingly, adjustment of knob 26 effectively slides the lenses 17, 18 proximally or distally, as desired.

Figure 7:
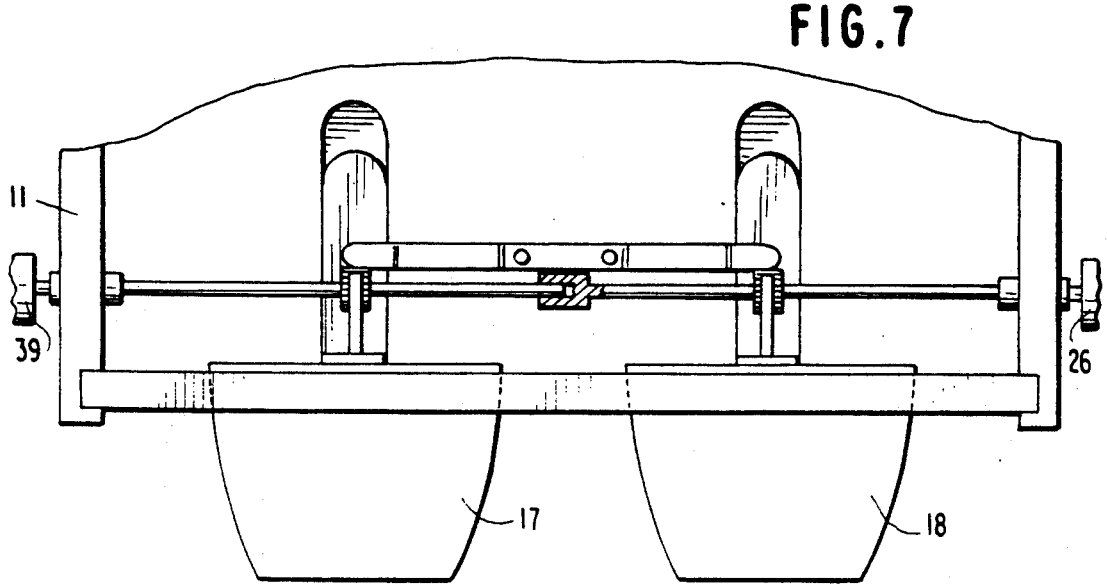
FIG. 7 is a partial top view of the adjustable viewing head housing with the top plate removed.

In a more preferred embodiment as shown in FIG. 7, the lenses 17, 18 are individually adjustable by means of separate adjusting knobs 26 and 39, which operate separate rack and pinion systems for each lenses in a manner similar to that described above with reference to FIG. 2.

The continuous stereoscopic film strip roll 23 is shown in viewing position in FIG. 2. The oppositely arranged spools 19 and 20 are designed so that one end of the stereo film may be inserted in either spool, so as to be removable, and appropriate advancement of either spool by the appropriate drive means results in motion of the filmstrip in a forward or reverse direction. The spool houses the stereoscopic film roll, similar to a standard 35 mm camera. Guide means 21 and 22 are placed within the viewing head so that the film roll passes from one spool 19, around the corresponding guide 21, the film then is passed through the viewing station 29 transversely to the optical axes of the viewing lenses 17 and 18, around guide 22, and onto oppositely arranged spool 20.

The viewing station 29 comprises the area through which the filmstrip 23 passes the optical axes of the lenses in viewing position, at a distance from the lenses suitably allowing for a stereoscopic image to be in focus. The viewing station preferably comprises a background screen 25, which reflects the light from the illumination means 24. The illumination means shown in FIG. 2 comprises two small light bulbs positioned between the filmstrip in the viewing position and the background screen, but below the horizontal plane created by the bottom of the filmstrip. In this manner, the illumination means and background screen provide a well lighted background against which the stereoscopic images maybe viewed.

The manner in which stereoscopic images are placed on slides or, on continuous stereoscopic film rolls, is known. The filmstrip comprises pairs of identical images spaced apart a fixed distance for showing successive pairs thereof (see FIG. 3, discussed below). The film is moved in a forward or reverse direction through the viewing station by means of foot control switch 14, so that one pair of images is optimally positioned relative to the optical axes of the viewing lenses in the viewing station.

FIG. 4 is a side view of the viewing head with the side plate removed, showing the drive means 30 associated with spool 19. The drive means associated with spool 20 is not shown in FIG. 4. Each of the drive means is associated with one of the spools 19 and 20, respectively, and each comprises a small electrically-driven motor or the like which is capable of spinning the spools. One of the motors is designed to spin one of the spools so as to pull the film through the viewing station in a right hand (seated in front of the viewing head) or forward direction, while the other motor is designed to spin the other spool and pull the film in a left hand or reverse direction through the viewing station. Naturally, both motors are not operable at the same time, and each is preferably operated by means of foot control switch 14 using the forward and reverse pedals. Alternatively, the film could be advanced in a forward or reverse direction through the viewing station by means of adjusting knobs (not shown) instead of the foot control switch, which, for example, could be positioned on the underside of the viewing head housing so as to operate each of the spools mechanically in the desired direction.

Figure 3:
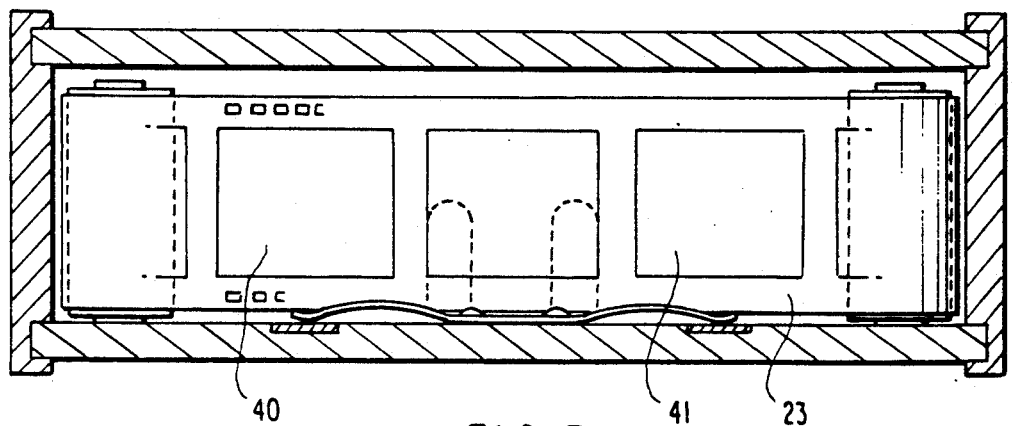
FIG. 3 is a front, cut-away view of the viewing head showing the filmstrip in viewing position (with lenses removed).

FIG. 3 is a front, cut-away view of the viewing head housing, with the lenses not shown. This drawing depicts the filmstrip 23 in a proper viewing position in the viewing station. Filmstrip frames 40 and 41 constitute a pair of identical images spaced apart a fixed distance, and are adapted to be viewed at the same time through the lenses, thus providing a three dimensional image.

While the present invention has been described in detail above, and with reference to specific preferred embodiments thereof, it would be readily apparent to those of ordinary skill in the art that various changes and modifications can be made thereto without departing from the spirit and scope thereof.

What is claimed is:

1. A teaching apparatus for continuous stereoscopic filmstrip viewing while simultaneously listening to a descriptively related audio tape comprising:
    (a) an adjustable stereoscopic viewing head which houses a continuous stereoscopic filmstrip roll, the filmstrip having pairs of identical images spaced apart a fixed distance for selectively viewing successive pairs thereof, comprising:
    a pair of viewing lenses having their optical axes at substantially interpupillary spacing,
    a pair of oppositely arranged spools and corresponding guide means in alignment with each of the spools to guide a filmstrip in a path transverse to the optical axes of the lenses as the filmstrip passes from one of the oppositely arranged spools to the other,
    a viewing station through which the filmstrip passes transversely to the optical axes of the lenses, including illumination means positioned between the filmstrip in the viewing station and a background screen for reflecting light,
    the lenses being adjustable proximally and distally relative to the filmstrip positioned transversely to the optical axes for focusing a stereoscopic image, and
    drive means associated with each of the spools, one functioning to advance the filmstrip in a forward direction through the viewing station, the other functioning to advance the filmstrip in a reverse direction through the viewing station, each of said drive means adapted to be mechanically operated at different times by a viewer, thus permitting selective viewing of desired images;
    (b) a base unit comprising:
    an audio cassette tape player, and
    means for operating an audio tape inserted in the cassette tape player in a forward direction and a reverse direction in a manner permitting selective listening to said audio tape descriptively related to said filmstrip images; and
    (c) means connecting the viewing head to the base unit and providing a conduit for wires connecting the drive means and the illumination means to a power source through the base unit, and allowing the viewing head to be adjusted vertically relative to the base unit, in an arc about the vertical axis of the connecting means, and to be tilted relative to a transverse horizontal axis.

2. The teaching apparatus according to claim 1, wherein the base unit further comprises earphones for use with the tape player.

3. The teaching apparatus according to claim 1, wherein said means for operating the audio tape in said forward and reverse directions comprises a foot control switch.

4. The teach apparatus according to claim 1, wherein the base unit further comprises a foot control switch for operating the drive means to advance the filmstrip in a forward direction and a reverse direction.

* * * * *